(12) United States Patent
Desmarais et al.

(10) Patent No.: US 7,080,856 B2
(45) Date of Patent: Jul. 25, 2006

(54) D-RING WITH UNIVERSAL MOVEMENT AND BOLT

(75) Inventors: Robert J. Desmarais, Lake Orion, MI (US); David Arnold, Sr., Macomb, MI (US); Bayard Temple, Roseville, MI (US)

(73) Assignee: Key Safety Systems, Inc., Sterling Heights, MI (US)

( * ) Notice: Subject to any disclaimer, the term of this patent is extended or adjusted under 35 U.S.C. 154(b) by 426 days.

(21) Appl. No.: 10/683,703

(22) Filed: Oct. 14, 2003

(65) Prior Publication Data

US 2005/0077718 A1    Apr. 14, 2005

(51) Int. Cl.
*B60R 22/00* (2006.01)

(52) U.S. Cl. .................................. 280/808; 297/483
(58) Field of Classification Search ................ 280/805, 280/801.1, 808, 748, 751; 297/468, 470, 297/483

See application file for complete search history.

(56) References Cited

U.S. PATENT DOCUMENTS

| 4,191,400 | A | * | 3/1980 | Smith ......................... 280/808 |
| 5,037,135 | A | * | 8/1991 | Kotikovsky et al. ........ 280/808 |
| 6,439,609 | B1 | | 8/2002 | Smithson |
| 6,478,334 | B1 | | 11/2002 | Desmarais |
| 2004/0253048 | A1 | * | 12/2004 | Schulz ....................... 403/122 |

* cited by examiner

*Primary Examiner*—Faye M. Fleming
(74) *Attorney, Agent, or Firm*—Lonnie Drayer

(57) ABSTRACT

A web guide assembly has a D-ring to receive a seatbelt. The D-ring is attached to a support by a joint. The joint allows universal movement relative to the support. The web guide assembly may be part of a vehicle restraint system.

2 Claims, 4 Drawing Sheets

D-RING WITH UNIVERSAL MOVEMENT AND BOLT

BACKGROUND OF THE INVENTION

This invention relates to a D-ring for a seatbelt.

A vehicle restraint system typically comprises a seatbelt anchored at various points to a vehicle body. The seatbelt or seatbelt web may have both a lap belt portion and a shoulder belt portion and may retract into a seatbelt retractor that takes up the slack of the seatbelt. The seatbelt has an anchoring point on the vehicle body above the anticipated height of a shoulder of a seated vehicle occupant. The anchoring point serves to support the shoulder belt portion of the seatbelt across the vehicle occupant. At this anchoring point, the seatbelt extends from the seatbelt retractor through a support loop, known as a D-ring, anchored above the seated vehicle occupant. The D-ring acts as a web guide for the seatbelt web and typically has a slot to receive the seat belt web.

The D-ring may cause binding of the seatbelt, reducing the ease of extension and retraction of the seatbelt relative to the seatbelt retractor. Due to binding of the seatbelt at this anchoring point, the seatbelt retractor requires additional mechanisms to reduce the level of effort required to extend and retract the seatbelt. For example, the seatbelt retractor may require a large spring motor. These additional mechanisms introduce significant expense to the overall cost of the vehicle restraint system. Accordingly, it would be desirable to reduce the binding of the seatbelt at this anchoring point.

Applicant has discovered that the binding of the seatbelt results from an inability of the D-ring to move freely with the shoulder belt portion of the seatbelt. To address this problem, Applicant has introduced a gap between the D-ring and the bolt anchoring the D-ring to the vehicle. This gap permits the D-ring to move more freely with the seatbelt. This feature, however, has a drawback. The gap between the D-ring and the bolt allows the D-ring to rattle. This rattling of a safety component of the vehicle is unpleasant as well as potentially disconcerting to the vehicle occupant.

A need therefore exists for an improved D-ring that offers more freedom of movement without any rattle.

SUMMARY OF THE INVENTION

The present invention comprises a novel vehicle restraint system and seatbelt support. The inventive vehicle restraint system has a unique D-ring located at the shoulder anchor point. In contrast to existing D-rings, the inventive D-ring has a pivot connection that permits the D-ring to pivot about the anchoring point, allowing the D-ring to move with the seatbelt. To reduce rattle, the pivot connection has a curved surface on which the D-ring may move relative to its anchoring support. In this way, the D-ring is retained securely on its support to eliminate rattling while still reducing binding of the seatbelt.

The pivot connection may comprise a curved surface that allows movement of the D-ring in a direction transverse to an axis of rotation of the D-ring. The curved surface may mate with another curved surface to improve the fit between the D-ring and the anchor support. These curved surfaces permit smooth movement of the D-ring relative to the support.

To further reduce rattling of the D-ring, a spring may extend between the D-ring and the vehicle body to buffer vibrations from the vehicle body. In addition, washers may retain the web guide on the support as well as provide a location for the curved surfaces. A polymer, such as nylon, may be used for these surfaces to further reduce rattle. A gap may exist between the support and the web guide to increase the level of movement between the support and the D-ring.

The invention encompasses a D-ring assembly having a joint connecting the D-ring to its anchor support. The web guide may be rotatable along an axis of the support and may further pivot in two additional directions relative to this axis of rotation. The joint may be a ball joint, having mated curved surfaces—one on the web guide and one on the support.

The invention further encompasses a method of securing a vehicle restraint. A seatbelt is connected to a seatbelt retractor and threaded through a D-ring. The D-ring is rotatably mounted on a support mountable to a vehicle body to allow for rotation about an axis. The D-ring may further pivot in two directions from a fixed point on the axis.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
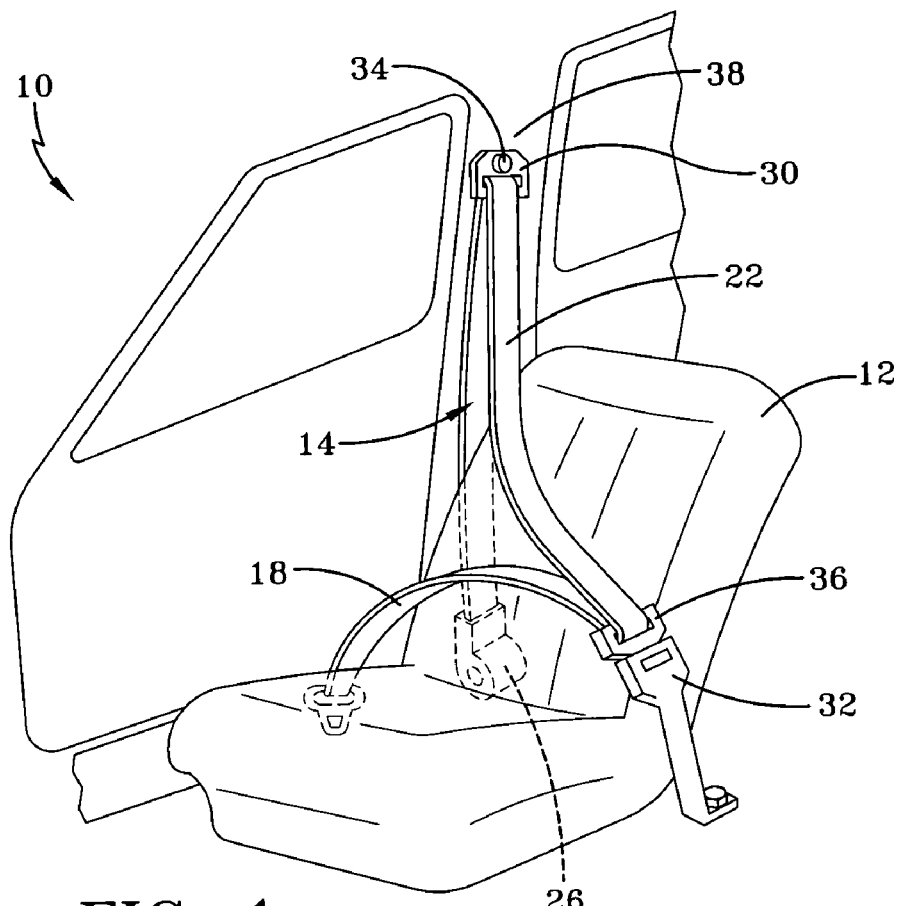
FIG. 1 illustrates a view of the inventive vehicle restraint system.

FIG. 1 illustrates a view of inventive vehicle restraint system 10 for seat 12. As shown, vehicle restraint system 10 comprises seat belt web 14 anchored to vehicle body 38. As known, seat belt web 14 has lap belt portion 18 and shoulder belt portion 22. Lap belt portion 18 is anchored to vehicle body 38 and loops through tongue 36, which selectively clips into buckle 32. From tongue 36, seatbelt web 14 extends across an anticipated shoulder and chest location of a vehicle occupant to form shoulder belt portion 22. Shoulder belt portion 22 loops through web guide 30, here a D-ring, and down toward seat belt retractor 26. These elements of vehicle restraint system 10 are known.

Figure 2:
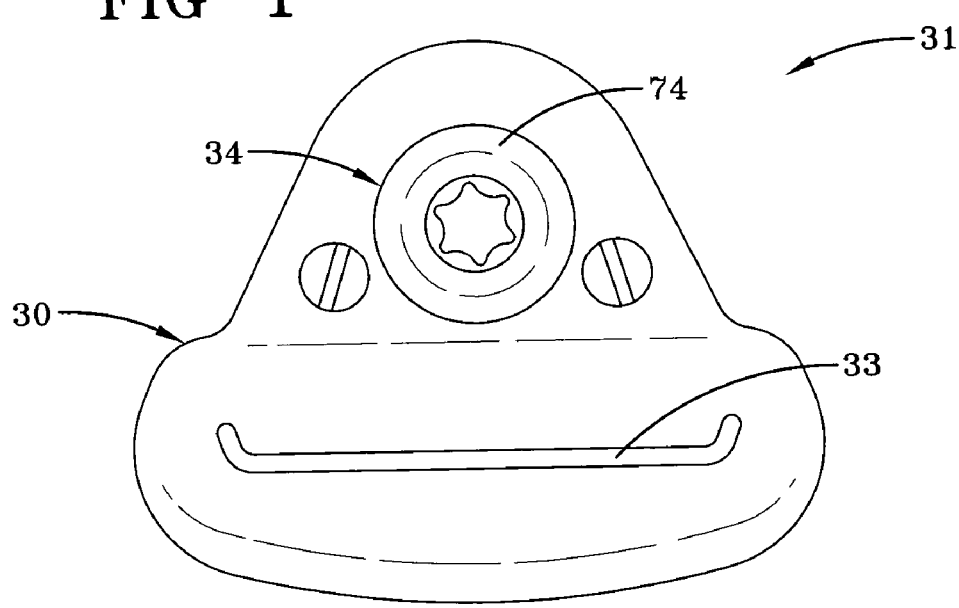
FIG. 2 illustrates a front view of the inventive web guide.

In contrast to existing vehicle restraint systems, inventive vehicle restraint system 10 has a novel web guide 30. As shown in FIG. 2, web guide 30 comprises a D-ring having slot 33 to receive a loop of seatbelt web 14. Web guide 30 is anchored to vehicle body 38 as shown in FIG. 1 by support 34, here a threaded bolt that extends through web guide 30 into vehicle body 38.

Figure 3:
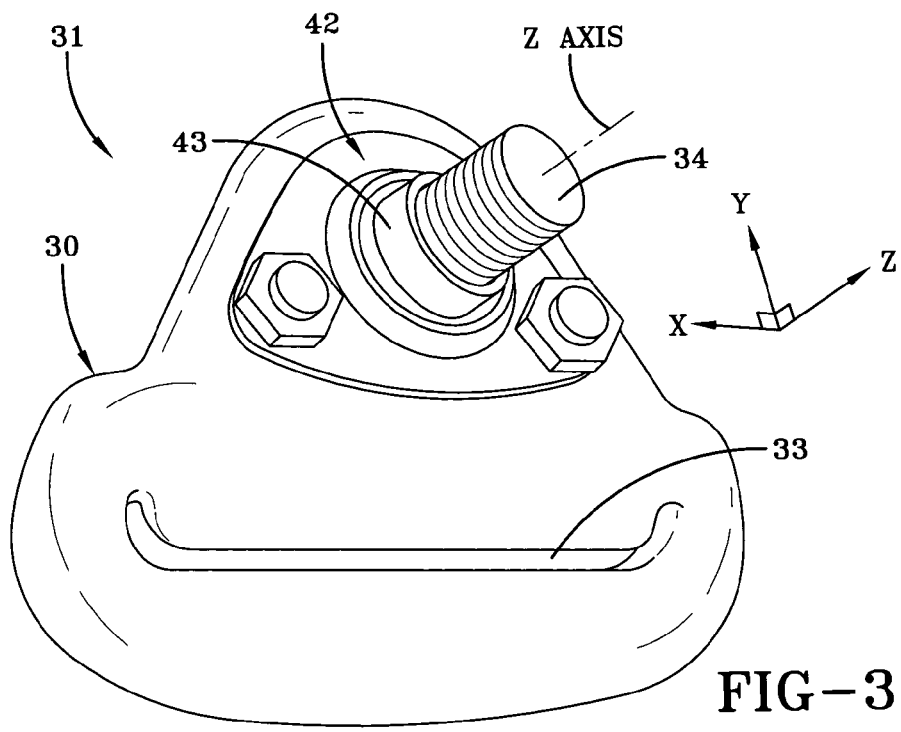
FIG. 3 illustrates a rear view of the inventive vehicle guide, including web guide, pivot connection, and support.

As shown in FIG. 3, support 34 is threaded. This threaded portion is mountable to vehicle body 38 through a threaded nut attached to vehicle body 38. Like existing web guides, inventive web guide 30 may rotate about an axis of support 34, here the Z-axis. In addition, web guide 30 is attached to support 34 by pivot connection 42. Pivot connection 42 permits movement of web guide 30 about support 34 in two different directions, here axis Y and axis X. Axis Y, axis Z, axis X are all orthogonal to each other. Accordingly, web guide 30 has three degrees of movement relative to support 34. Web guide 30 may rotate about the Z axis and pivot relative to the Z axis along the Y axis and along the X axis. That is, web guide 30 is effectively mounted on a universal joint. This feature greatly reduces the level of binding of seatbelt web 14 in the area of slot 33.

Figure 4:
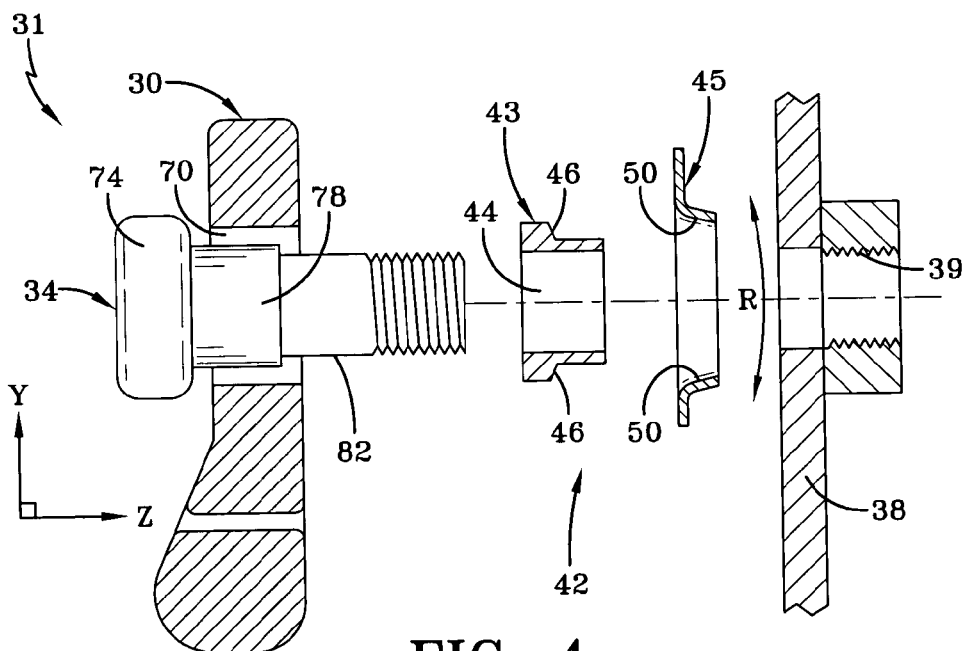
FIG. 4 illustrates a side view of inventive web guide of FIGS. 2–3, showing an exploded view of the web guide assembly.

FIG. 4 illustrates a side exploded view of the inventive web guide assembly 31. As shown, support 34 extends through web guide 30 to connect with vehicle body 38 through threaded hole 39. Web guide 30 may rotate about Z-axis. In addition, pivot connection 42 allows web guide 30 to pivot along the Y axis as well as the X-axis. Pivot connection 42 comprises first portion 43 and second portion 45. First portion 43 has first spherical surface 46 extending circumferentially around first portion 43. Second portion 45 has second spherical surface 50 to receive in a mating fashion first spherical surface 46. Both first spherical surface 46 and second spherical surface 50 extend generally along arc R, which is transverse to the Z axis. In this way, first spherical surface 46 may move relative to second spherical surface 50 along arc R so as to permit first portion 43 to pivot relative to second portion 45 along arc R.

In addition, because first spherical surface 46 and second spherical surface 50 extends circumferentially around first portion 43 and second portion 45, respectively, first portion 43 may further pivot relative to second portion 45 along the X axis. Surfaces 46, 50 thus provide a support for web guide 30 to pivot without rattle.

Support 34 comprises head portion 74, shoulder portion 78, and body portion 82. Body portion 82 has threads to be received through vehicle body 38 into threaded hole 38. As shown in FIG. 4, shoulder portion 78 extends through guide 30. Gap 70 exists between web guide 30 and shoulder portion 78 and allows web guide 30 to pivot with second portion 45.

Support 34 further has body portion 82 sized to fit closely into hole 44 of first portion 43. Hole 44 is about the same diameter as body portion 82. However, shoulder portion 78 has a diameter greater than the diameter of hole 44 so that first portion 43 sits on shoulder portion 78 when fully assembled. In this way, first portion 43 is prevented from limiting movement of web guide 30 when web guide 30 pivots about the Z-axis along the Y or X axis. It should be noted that gap 70 dictates the amount of pivoting along the X and Y axis relative to the Z axis.

Figure 5:
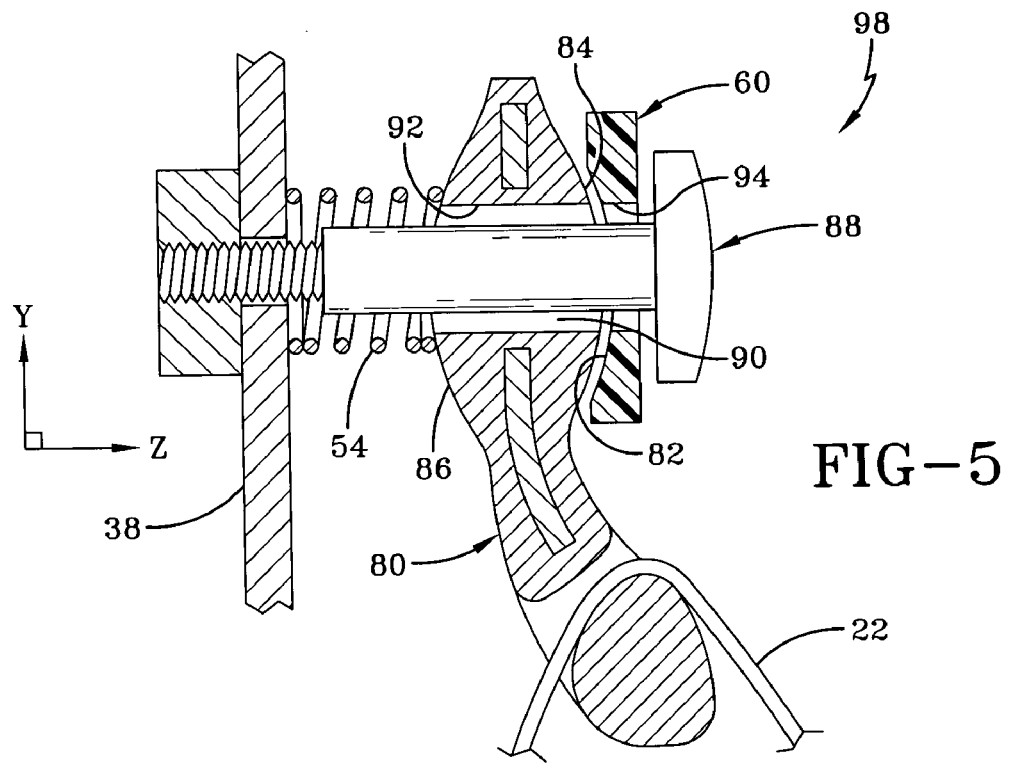
FIG. 5 illustrates an alternative design of the inventive web guide assembly.

FIG. 5 illustrates an alternative design embodying the invention. Web guide assembly 98 comprises web guide 80 on support 88. Support 88 is mounted to vehicle body 38. Web guide 80 has hole 92 to receive support 34. Hole 92 is oversized and consequently gap 90 exists between support 88 and web guide 80 as shown. Gap 90 permits web guide 80 to pivot relative to support 34 along the Y and X axis. In addition, web guide 80 is disposed between washer 60 and spring 54. Washer 60 may be a polymer, such as nylon, to reduce rattling. Spring 54 is concentric with support 34 and extends between vehicle body 38 and web guide 80. Spring 54 is biased to press web guide 80 into washer 60 to reduce rattling of web guide during vehicle operation. Washer 60 is supported by support 34 and has hole 94, which is also oversized so as to create gap 90 between washer 60 and support 34. Washer 60 also has first spherical surface 82 to receive a matching second spherical surface 84 of web guide 80. First spherical surface 82 permits second spherical surface 84 to pivot in the Y and X direction. Gap 90 dictates the amount of pivoting of web guide 80 relative to support 34. Web guide 86 also has spherical surface 86 that reduces friction between web guide 80 and spring 54 when web guide 80 pivots relative to support 34.

Figure 6:
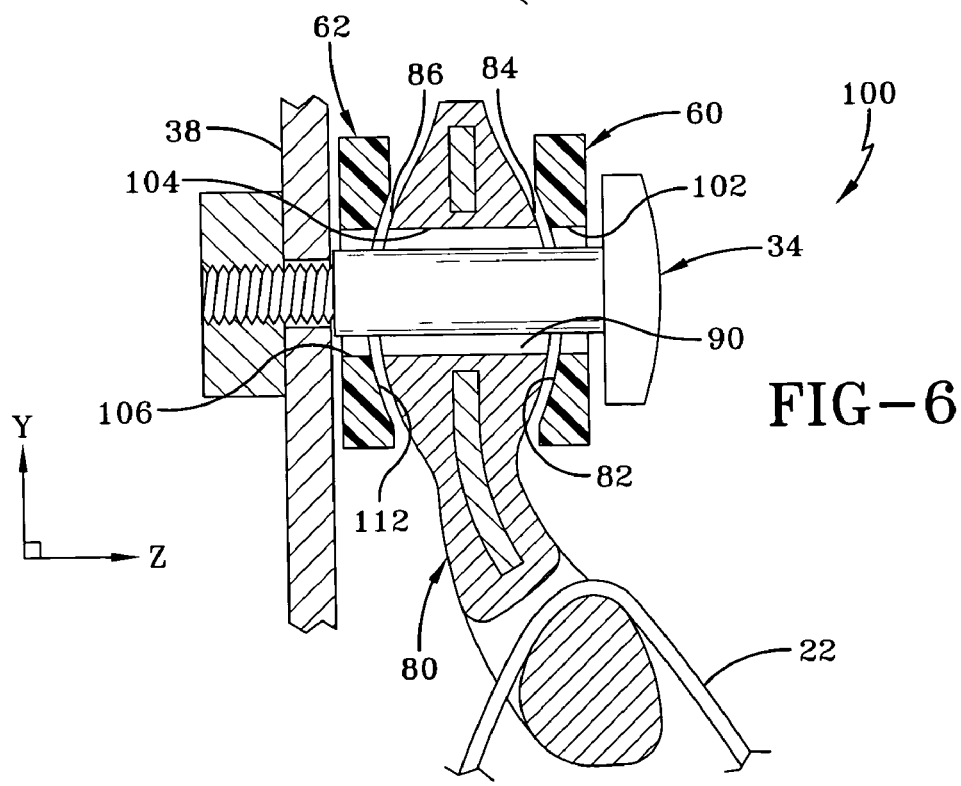
FIG. 6 illustrates another alternative design of the inventive web guide assembly.

FIG. 6 illustrates a similar design to the design of FIG. 5. Like the previous design, web assembly guide 100 comprises support 34 mounted to vehicle body 38. Web guide 80 is disposed between washer 60 and vehicle body 38. However, unlike the previous design, spring 58 is replaced by washer 62, preferably another polymer washer. Washer 60, web guide 80 and washer 62 each have holes 102, 104 and 106 respectively to receive support 34. Holes 102, 104 and 106 are oversized to receive support 34 so as to produce gap 90. Gap 90 is the same for washer 60, web guide 80 and washer 62. Again, gap 90 dictates the amount web guide 80 will pivot relative to support 34 relative to the Z axis in the Y and X direction. Washer 60 has first spherical surface 82 mated to second spherical surface 84 while washer 62 has fourth spherical surface 112 mated to third spherical surface 86 of web guide 80. Spherical surfaces 82, 84, 86 and 112 permit web guide 80 to pivot relative to support 34 in the X and Y direction relative to the Z axis. In addition, washer 60 and washer 62 retain web guide 80 closely to vehicle body 38 so as to reduce rattling.

Figure 7:
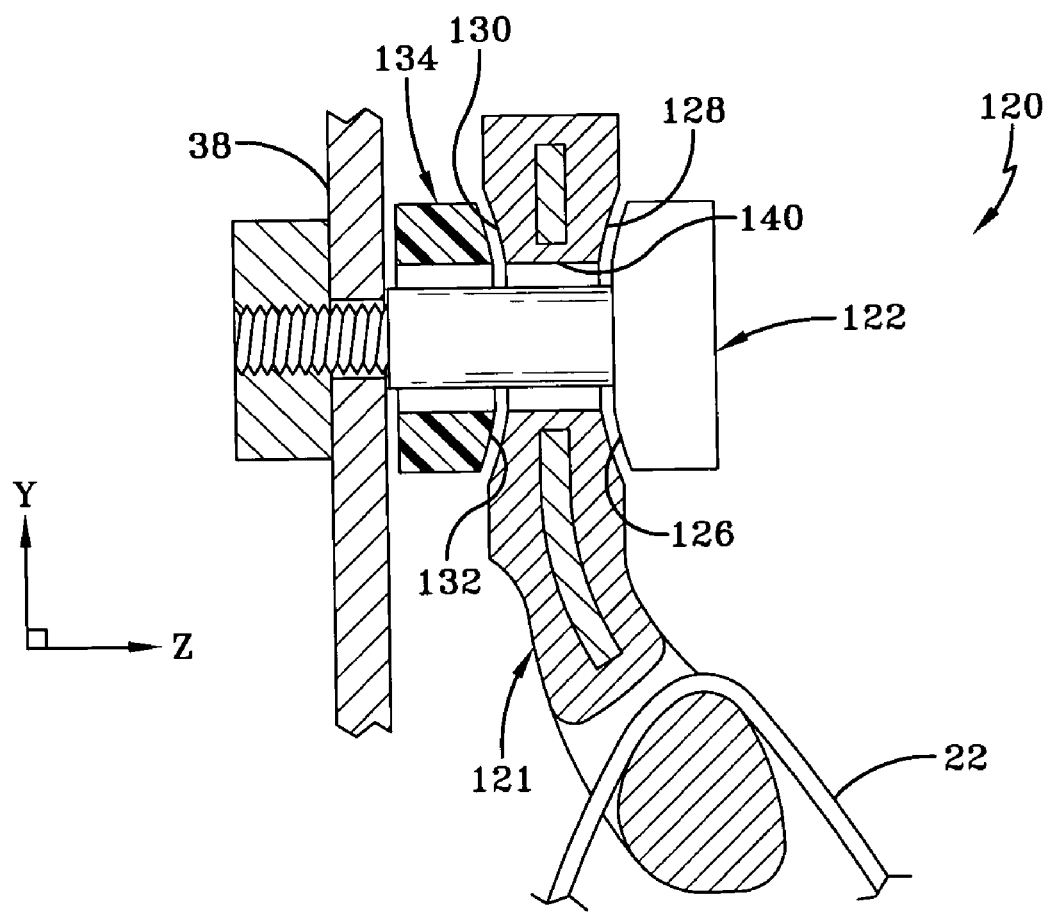
FIG. 7 illustrates an additional web guide design.

FIG. 7 illustrates another design embodying the invention. Web guide assembly 120 has web guide 121. Web guide 121 has hole 140 to receive support 122. Hole 140 is oversized so that gap 124 may exist between web guide 121 and support 122. Support 122 is mounted to vehicle body 38. In this design, support 122 is formed with first spherical surface 126 to mate with second spherical surface 128 of web guide. In addition, web guide 121 has third spherical surface 130, which mates with fourth spherical surface 132 of washer 134. First, second, third and fourth spherical surfaces 126, 128, 130 and 132, as well as gap 124, permit web guide 121 to pivot relative to support 122 the Z axis of support 122 in the Y and X direction while retaining web guide 121 along.

The aforementioned description is exemplary rather that limiting. Many modifications and variations of the present invention are possible in light of the above teachings. The preferred embodiments of this invention have been disclosed. However, one of ordinary skill in the art would recognize that certain modifications would come within the scope of this invention. Hence, within the scope of the appended claims, the invention may be practiced otherwise than as specifically described. For this reason the following claims should be studied to determine the true scope and content of this invention.

What is claimed is:

1. A web guide assembly comprising:
   a web guide for receiving a seat belt web;
   a support mountable to a vehicle body, said web guide rotatable about a first axis extending along said support;
   a ball joint connecting said web guide to said support, said joint fixed to said support along said first axis and pivotal along a second axis transverse to said first axis; and
   a spring extending along said first axis in communication with said web guide, said spring extending between said web guide and a vehicle body.

2. The web guide assembly of claim 1 wherein said web guide comprises a D-ring.

* * * * *